Patented Jan. 6, 1925.

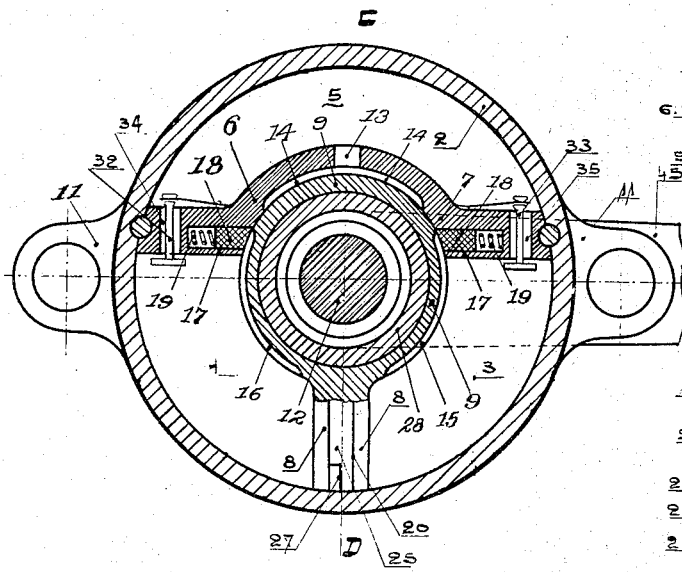

1,521,602

UNITED STATES PATENT OFFICE.

ERNEST DERIHON, OF LIEGE, BELGIUM, ASSIGNOR TO SOCIÉTÉ ANONYME USINES DERIHON, OF LONCIN LEZ LIEGE, BELGIUM.

SHOCK ABSORBER FOR MOTOR CARS AND OTHER SUSPENDED VEHICLES.

Application filed October 1, 1923. Serial No. 665,992.

*To all whom it may concern:*

Be it known that I, ERNEST DERIHON, engineer, a subject of the King of the Belgians, residing at 364 Rue St. Laurent, Liege, Belgium, have invented certain new and useful Improvements in Shock Absorbers for Motor Cars and Other Suspended Vehicles, of which the following is a specification, reference being had therein to the accompanying drawing.

The present invention relates to that type of shock absorbers for motor cars or any other suspended vehicles in which, the movement of the spring is transmitted to a shaft carrying the shock absorber device proper which is caused to work within a pressure tight box containing oil or other fluid, in such a manner that the fluid offers a resistance to the movement of the spring towards its normal position in either direction, but allows of the spring moving freely in either direction away from its normal position.

The principal object of the present invention consists in a special arrangement of the movable parts of the device, which arrangement reduces the wear of the different parts to a minimum not attained heretofore and increases at the same time their pressure tightness to the maximum.

The annexed drawing represents by way of example two methods of carrying into effect the object of the present invention.

Figure 1 represents a sectional view of the device, the section being taken along the line A—B Figure 2.

Figure 2 represents an axial section through the device taken along the line C—D Figure 1.

Figure 3 represents a section through a modified arrangement of the device, taken along the line E—F Figure 4.

Figure 4 represents an axial section through said modified arrangement taken along the line G—H Figure 3.

Figure 5 represents a lateral view of the movable partition of the device.

Figure 6 is a detail view.

The device comprises a box having a bottom part 1 and a cover 2 which are jointed together in any suitable manner.

The interior of said box is divided within three compartments 3, 4, 5 by means of three partitions 6, 7, 8. The partitions 6 and 7 are fixed and may be constituted of a single piece, whereas the partition 8 is movable in an angular sense.

The movable partition 8 is provided with a hub-portion 9 which is capable of rotating upon a fixed pivot or trunnion 10 forming part of the bottom 1 of the box. This latter may be provided with lugs or the like 11 by means of which the whole device is fixed upon the frame or chassis of the vehicle.

The hub-portion 9 of the movable partition 8 is provided with a prolongation 12 to which is fixed a lever 45 (see Figure 1), which in its turn communicates in any desired manner with the axle of the vehicle.

The fixed partitions 6 and 7 are provided with a common passage 13 and with a groove 14 communicating with said passage 13 (see Figures 1, 2, 3, 4).

On the other hand the hub-portion 9 of the movable partition 8 is provided upon its peripheral face with grooves or the like 15 and 16 (see Figure 5).

The purpose of the passage 13 and grooves 14, 15, 16 will be explained hereafter.

The fixed partitions 6 and 7 are provided each with a notch 17 containing a movable segment 18 of any suitable shape and one or a plurality of suitable springs 19 pressing said segments 18 against the peripheral face of the hub-portion 9 of the movable partition 8. In this way there is obtained an intimate contact and consequently a perfect tightness between the fixed partitions 6 and 7 and the hub-portion 9 of the movable partition 8.

The movable partition 8 is equally provided with a notch 20 disposed within the plan of the axis of rotation of this partition. The bottom of the notch 20 is preferably disposed by steps (see Figures 2 and 5). Thus, I obtain in the movable partition 8 a massive portion 21 which is provided with perforations 22 and 23 the first of which contains a spring 24 acting upon the two lateral segments 25, whereas the perforation or groove 23 contains a spring 26 acting upon the inferior segment 27.

The extremities of the segments 25 and 27 which are in contact with each other may be suitably shaped for their mutual engagement, for example in such a manner as represented in Figure 1. This arrangement assures an intimate contact and consequently a perfect tightness between the movable partition 8 and the interior lateral and peripheral faces of the box.

The cover 2 of the box has a central sleeve-shaped portion 28 directed axially within the interior of the box and fitting within a circular groove 29 provided within the hub 9 and serving as a double support for the latter.

The sleeve 28 and prolongation 12 of the hub 9 form an annular chamber 30 which may be designated as a tightening chamber.

The outer orifice of the chamber 30 is adapted to receive a stuffing nut 31 which letter serves simultaneously as a supplementary support for the lengthened portion 12 of the movable partition 8, 9.

The partition 8, 9 disposes consequently of a quadruple support and of a quadruple guiding device, as there are the pivot 10, the interior face of the sleeve 28, the external face of the sleeve 28, and the stuffing device 31. This arrangement reduces the wear of the device to the minimum simultaneously increasing its pressure tightness to the maximum.

According to Figure 1 the device is completed by two or more suitably controlled automatic valves of any kind 32 and 33, which serve to control the passages 34 and 35 provided within the fixed partitions 6 and 7 respectively and serving to establish a direct alternative communication between the chamber 5 on the one hand and each of the chambers 3, 4 on the other hand.

According to Figures 3, 4, 5 and 6 the valves 32, 33 are replaced by a suitable double-wing shaped obturating part 36 the central portion 37 of which may be strengthened so as to serve as a pivot.

The obturating part 36 is disposed within a suitable notch 38 provided within the piece which forms the fixed partitions 6, 7 or formed by these latter if said partitions are constituted by separate pieces. In this modified construction the partitions 6, 7 may be provided with further passages 39, 40 situated at any suitable points. If desired, the obturating part 36 may be pressed laterally against the bottom 1 of the box by means of springs 41 (see Figure 6) which are disposed in holes or the like 42 provided within the piece or pieces forming the fixed partitions 6, 7.

Intermediate parts such as 43 may be interposed between the obturating part 36 and the springs 41. Moreover the end portions of the groove 38, that is to say the places where this groove opens upon the interior peripheral face of the cover 2, may receive segments 44 as represented by dotted lines in Figure 3. In this case the end portions of the obturating part 36 are shaped correspondingly, as likewise represented by dotted lines in Figure 3. If the obturating part 36 moves upwards on the one side, its corresponding end portion will come into contact with the corresponding segment 44, and thus any passage between said obturating part 36 and the segment 44 on the one hand, and between the segment 44 and the interior peripheral face of the cover 2 on the other hand will be completely cut off, and this in a most tight manner.

The device operates as follows:

Supposing the lever 45 moves upwards which may happen as well during the compression as during the expansion of the spring or springs, and supposing these latter have just occupied their normal position, the movable partition 8 will move to the right. The oil or other suitable fluid contained within the chamber 3 will then flow from this latter to the chamber 5, and this by reason of the movement of the partition 8 and of its hub 9 which movement will establish a communication between the groove 15 of the hub 9 and the groove 14 with passage 13 of the fixed partitions 6, 7. At the same time the oil contained within the chamber 5 will flow from this latter through passages 34, 39 (see Figure 3) to the chamber 4. As soon as the spring will begin the return movement towards its normal position said return movement will be considerably braked, because the partition 8, which moves at this time to the left, will compress the oil within the chamber 4, the passage 34 of which will be closed by the valves 32 or by the corresponding portion of the obturating part 36 (see Figure 3) whereas the groove 16 of the hub 9 will be cut off from the groove 14.

It is obvious that the device will operate in the manner described above in both directions, that is to say during the return movements of the spring as well from its compressed position as from its expanded position to the normal position.

What I claim is:

1. In a shock absorber for motor cars or any other vehicles of the suspended type, allowing the springs to move freely in either direction away from their normal position and offering a resistance to the movements of the springs in either direction towards their normal position, an essentially cylindrical oil or other fluid chamber, two fixed partitions and one movable partition within said chamber, dividing the same in three compartments, the movable partition permitting to variate the capacity of two of said compartments, suitable means within said partitions affording a self-controlling alternative communication between the two compartments of variable capacity and the compartment of constant capacity or intermediate compartment, suitable tightening means within said partitions to render these latter pressure tight as well with respect to each other as with respect to said chamber and a suitable multiple supporting device for said movable partition.

2. In a shock absorber for motor cars or any other vehicles of the suspended type, allowing the springs to move freely in either direction away from their normal position and offering a resistance to the movements of the springs in either direction towards their normal position, an essentially cylindrical pressure tight box, two transversely disposed fixed partitions and one part-diametrally disposed movable partition within said box, an axially disposed pivot upon the bottom of said box, said pivot serving to enter a hub-shaped portion of the movable partition, the peripheral face of said hub shaped portion partly engaging a correspondingly shaped concavity formed by the two fixed partitions each of said fixed partitions being provided with a suitable number of passages controlled by automatic valves, said passages establishing a direct communication between the compartment of constant capacity and the compartments of variable capacity, grooves within said concavity of the fixed partitions, a suitable number of passages between said grooves and the compartment of constant capacity, and grooves upon the peripheral face of said hub-shaped portion of the movable partition, all these grooves serving to alternatively establish and interrupt a communication between the compartment of constant capacity and either of the compartments of variable capacity in dependance from the angular position of the movable partition, a lengthened portion upon said hub-portion passing to the outside and serving as a controlling shaft for the movably partition, suitable tightening means within said partitions to render them pressure tight as well with respect to each other as with respect to said chamber and a suitable multiple supporting device for said movable partition.

3. In a shock absorber for motor cars or any other vehicles of the suspended type, allowing the springs to move freely in either direction away from their normal position and offering a resistance to the movements of the springs in either direction towards their normal position, an essentially cylindrical pressure tight box, two transversely disposed fixed partitions and one part diametrally disposed movable partition within said box, an axially disposed pivot upon the bottom of said box, said pivot entering a hub shaped portion of the movable partition, the peripheral face of said hub shaped portion partly engaging a correspondingly shaped concavity formed by the two fixed partitions, a suitable notch within said fixed partitions, a double-wing shaped obturating part movably mounted within said notch, passages within said fixed partitions controlled by said obturating part and establishing a direct communication between either of the compartments of variable capacity and the compartment of constant capacity, suitable contact faces between said fixed partitions and said movable partition, said contact faces being provided with passages and grooves serving to establish and to interrupt the communication between either of the compartments of variable capacity and the compartment of constant capacity in dependance from the angular position of the movable partition, spring controlled segments suitably disposed within the fixed partitions, within the movable partition and within said notch of the fixed partitions said segments serving to afford a pressure tight contact of said partitions with each other, of said partitions with the interior faces of said chamber and of said obturating part with the interior faces of said chamber, a lengthened portion upon said hub shaped portion of the movable partition serving as a controlling shaft for this latter, and a suitable multiple supporting device for said movable partition.

4. In a shock absorber for motor cars or any other vehicles of the suspended type, allowing the springs to move freely in either direction away from their normal position and offering a resistance to the movements of the springs in either direction towards their normal position, an essentially cylindrical pressure tight chamber, two fixed partitions and one movable partition within said chamber, said movable partition having a hub shaped portion, which rotatably engages the fixed partitions, suitable passages upon the mutual contact faces of said partitions, suitably controlled passages within the fixed partitions, suitably controlled tightening devices within said partitions, a pivot axially projecting from the bottom wall of said chamber, said hub-shaped portion of the movable partition being rotatably mounted upon said pivot and being provided with a lengthened portion going to the outside and serving as a central shaft and with an annular groove surrounding said lengthened portion, an inwardly directed sleeve-shaped portion upon the top wall of said chamber, said sleeve shaped portion fitting within said annular groove thus serving as a double support for the movable partition, an annular chamber between said lengthened portion of the hub and the orifice portion of said sleeve, this chamber being adapted to receive any stuffing device, the stuffing nut having an axial perforation serving as a support for said lengthened portion or central shaft of the movable partition.

In testimony whereof I hereunto affix my signature.

ERNEST DERIHON.